(12) United States Patent
Gaborieau Borissenko et al.

(10) Patent No.: US 11,415,530 B2
(45) Date of Patent: Aug. 16, 2022

(54) METHOD FOR DETERMINING PHYSICAL PROPERTIES OF A SAMPLE

(71) Applicant: DETECTION TECHNOLOGY SAS, Moirans (FR)

(72) Inventors: Elena Gaborieau Borissenko, Moirans (FR); Didier Perion, Moirans (FR)

(73) Assignee: DETECTION TECHNOLOGY SAS, Moirans (FR)

( * ) Notice: Subject to any disclaimer, the term of this patent is extended or adjusted under 35 U.S.C. 154(b) by 220 days.

(21) Appl. No.: 16/620,031

(22) PCT Filed: Jun. 7, 2018

(86) PCT No.: PCT/EP2018/064974
§ 371 (c)(1),
(2) Date: Dec. 6, 2019

(87) PCT Pub. No.: WO2018/224580
PCT Pub. Date: Dec. 13, 2018

(65) Prior Publication Data
US 2020/0096456 A1  Mar. 26, 2020

(30) Foreign Application Priority Data

Jun. 7, 2017 (FR) ...................... 1755035

(51) Int. Cl.
*G01N 23/10* (2018.01)
*G01N 23/087* (2018.01)
*G01V 5/00* (2006.01)

(52) U.S. Cl.
CPC ........... *G01N 23/087* (2013.01); *G01N 23/10* (2013.01); *G01V 5/0041* (2013.01);
(Continued)

(58) Field of Classification Search
None
See application file for complete search history.

(56) References Cited

U.S. PATENT DOCUMENTS

| 5,121,337 A | 6/1992 | Brown |
|---|---|---|
| 10,564,113 B2 | 2/2020 | Paulus |

(Continued)

FOREIGN PATENT DOCUMENTS

| CN | 1264466 A | 8/2000 |
|---|---|---|
| CN | 103069305 A | 4/2013 |

(Continued)

OTHER PUBLICATIONS

Office Action for Japan Application No. 2019-568186, dated Mar. 23, 2021 (5 pages).

(Continued)

*Primary Examiner* — Hoon K Song
(74) *Attorney, Agent, or Firm* — Alston & Bird LLP (57) ABSTRACT

Disclosed is a method for determining physical properties of a test sample using a spectrometric detector with at least three channels, consisting of: performing measurements in each of the channels on the test sample, calculating variables, each formed from a combination of measurements of different channels, and applying a weighting and bias matrix to the variables, enabling the investigated physical properties of the test sample to be determined.

10 Claims, 5 Drawing Sheets

(52) U.S. Cl.
CPC . *G01N 2223/04* (2013.01); *G01N 2223/1006* (2013.01); *G01N 2223/303* (2013.01); *G01N 2223/423* (2013.01); *G01N 2223/50* (2013.01); *G01N 2223/639* (2013.01)

(56) References Cited

U.S. PATENT DOCUMENTS

| | | |
|---|---|---|
| 2004/0218728 A1 | 11/2004 | Heismann |
| 2006/0140340 A1* | 6/2006 | Kravis ................. G01V 5/0041 378/57 |
| 2007/0183568 A1 | 8/2007 | Kang et al. |
| 2013/0110438 A1 | 5/2013 | Rinkel et al. |
| 2016/0209336 A1* | 7/2016 | Sung ..................... G01N 23/04 |
| 2016/0238543 A1 | 8/2016 | Powell |
| 2016/0363545 A1 | 12/2016 | Gorecki et al. |

FOREIGN PATENT DOCUMENTS

| | | |
|---|---|---|
| CN | 104769418 A | 7/2015 |
| DE | 10305105 A1 | 8/2004 |
| JP | 2010091483 A | 4/2010 |
| JP | 2011024773 A | 2/2011 |
| JP | 2011257288 A | 12/2011 |
| WO | WO 98/41825 A1 | 9/1998 |
| WO | WO 2012/000993 A1 | 1/2012 |
| WO | WO 2013/191566 A1 | 12/2013 |
| WO | WO 2015/091083 A1 | 6/2015 |
| WO | WO 2017/006059 A1 | 1/2017 |
| WO | WO 2017/006059 A1 | 2/2020 |

OTHER PUBLICATIONS

Perion, Didier et al., "Material discrimination and imaging improvement using high count rate X-ray spectrometric detector for non-destructive testing and security applications" 2016 IEEE Nuclear Science Symposium, Medical Imaging Conference and Room-Temperature Semiconductor Detector Workshop (NSS/MIC/RTSC), Oct. 29, 2016.
International Search Report and Written Opinion for PCT/EP2018/064974 dated Sep. 10, 2018.
Chinese Application No. 201880038249.8, First Office Action dated Sep. 22, 2021.
Pattern Recognition, Chapter 4 Linear Discriminant Function Classifier, Section 4.1 Linear Discriminant Function and Linear Classification Interface, edited by Jiafeng Liu al., Harbin Institute of Technology Press, Aug. 2014, ISBN 987-7-5603-4763-9 (3 pages).
Coursebook for Probability Theory & Mathematical Statistics, Section 7.2.3 Mean-square Error, edited by Ming Han, Shanghai: Tongji University Press, Apr. 2014, ISBN 978-7-5608-5462-5 (2 pages).
Chinese Application No. 201880038249.8, Second Office Action dated Mar. 7, 2022, 7 pgs.

* cited by examiner

METHOD FOR DETERMINING PHYSICAL PROPERTIES OF A SAMPLE

CROSS-REFERENCE TO RELATED APPLICATIONS

This application is a national phase entry of International Application No. PCT/EP2018/064974, filed Jun. 7, 2018, which claims priority to French Patent Application No. 1755035, filed on Jun. 7, 2017, the entire contents of which are incorporated herein by reference.

FIELD

The invention relates to the field of materials analysis by ionizing radiation, in particular x-radiation or gamma radiation.

BACKGROUND

The applications of x-radiation or gamma radiation were developed in the field of nondestructive testing and security, for example the detection of explosive materials. In the field of nondestructive testing, several applications have, for example, been to determine the fat level in a meat.

For such applications, multi-energy measurements are done. More specifically, the object to be analyzed is positioned between a polychromatic spectrum source and a multi-energy detector. This multi-energy detector is, for example, a spectrometric detector or scintillation detector associated with several filters defining different energy bands.

For example, from two energy bands, it is possible to measure attenuation coefficients of the incident radiation for each of the energy bands. Reference materials are used that make it possible to define a comparison base of attenuation coefficients. Next, the attenuation coefficients of a test material make it possible to position it in this comparison base in order to find properties of the test material, for example its fat level.

More specifically, the transmission of an object characterizes the quantity of photons that pass through it without interaction, mathematically, that is to say, the ratio between the photon flux after the object and the photon flux before the object in a given energy band.

Material identification by radiography is related to the manner in which the materials interact with the x-rays or gamma rays. The likelihood of absorption (or the effective interaction section) of the x-rays or gamma rays by a material depends on its effective atomic number ($Z_{eff}$) and the energy of the x-rays or gamma rays. The effective atomic number reflects the number of electrons in the electron cloud interacting with the x-rays or gamma rays. In the case of a pure chemical element (carbon, iron, gold, etc.), the effective atomic number is equal to the atomic number Z of the chemical element ($Z_{eff}=Z$). In the case of a compound, the effective atomic number is approximated by the average number of electrons per unit of volume.

Each material is characterized by its own attenuation spectrum. An attenuation spectrum is a function describing the likelihood of interaction of a photon with the material as a function of the energy of the photon. Fundamentally, three physical phenomena have been identified to show the interaction between the x-rays or gamma rays and the material: the photoelectric effect, the Rayleigh or elastic diffusion, and the Compton or inelastic diffusion. In these three phenomena, the atomic number and the energy of the X photons intervene at different powers.

The identification of a material consists of characterizing this material by one or several physical properties such as, for example, the effective atomic number $Z_{eff}$, the density, the content (or percentage) of one material in another.

Using known methods, as for example described in document US 2013/0110438 A1, it is possible to determine how the multi-energy measurement done on a test sample is broken down. Based on more than 2 materials, the result will always be a probability distribution only taking account of the two materials whose measurements frame the measurement of the test sample. This method can therefore work to measure the fat level, for example, but not to find an effective atomic number among a large number of materials.

Furthermore, for a given material, the attenuation depends on the thickness of the sample used. The greater its thicknesses, the stronger the attenuation is. The known methods are very poorly suited to this parameter, and to recognize a material, it is generally necessary to use samples of predetermined thickness. This constraint is not suitable for testing luggage, where the dimensions of the objects to be tested are unknown due to their very nature.

SUMMARY

The invention seeks to offset all or some of the aforementioned problems by proposing a new method for determining physical properties of a sample using a spectrometric detector able to adapt to any sample thickness. The invention also seeks to improve the precision of the determination, for example when it involves looking for a proportion of one material in another.

To that end, the invention relates to a method for determining physical properties of a test sample using a spectrometric detector with at least three channels, consisting of:
  performing measurements in each of the channels on the test sample,
  calculating variables, each formed from a combination of measurements of different channels,
  applying a weighting and bias matrix to the variables, enabling the investigated physical properties of the test sample to be determined, the values being able to vary continuously.

Advantageously, the variables form a "variable vector," and the application of the weighting and bias matrix to the variable vector yields a result vector, the components of which are the values of the investigated physical properties.

Advantageously, the variables are normalized using a ratio between useful measurements of a radiation attenuated by the sample and empty measurements of the radiation not attenuated by the sample. The variables can be normalized using a logarithm of the ratio.

Advantageously, the method additionally consists of:
  performing measurements in each of the channels on several calibration samples with different thicknesses and different materials,
  calculating the variables on each of the calibration samples,
  during a first calibration step, using a regression method, linking the variables relative to the calibration samples to expected values of the investigated properties of the calibration samples, by defining the weighting and bias matrix.

Advantageously, the method additionally consists of:
during a second calibration step, applying the weighting and bias matrix to the variables relative to the calibration sample in order to obtain calculated values of the properties of the calibration samples, and calculating a mean square error to be minimized, relative to a deviation between the calculated values of the properties of the calibration samples and the expected values of the properties of the calibration samples,
if the value of the mean square error is less than or equal to a predetermined threshold, validating the weighting and bias matrix,
if the value of the mean square error is above the threshold, modifying the measurement combination of the different variables, then repeating the first and second calibration steps until the value of the mean square error is less than or equal to the threshold.

Advantageously, the method additionally consists of:
during a second calibration step, applying the weighting and bias matrix to the variables relative to the calibration samples in order to obtain calculated values of the properties of the calibration samples, and calculating a mean square error to be maximized, relative to a deviation between the calculated values of the properties of the calibration samples and the expected values of the properties of the calibration samples,
if the value of the mean square error is greater than or equal to a predetermined threshold, validating the weighting and bias matrix,
if the value of the mean square error is below the threshold, modifying the measurement combination of the different variables, then repeating the first and second calibration steps until the value of the mean square error is less than or equal to the threshold.

Advantageously, the determination of the investigated physical properties calls on at least one parameter, and the at least one parameter is suitable for assisting with measurements done in each of the channels on a reference sample of predetermined thickness and at least one investigated property of which is known.

Advantageously, the measurements of the reference sample are done simultaneously with the measurements on a test sample, and the parameter is suitable for determining investigated physical properties of the sample to be tested.

Advantageously, the at least one parameter is suitable for assisting with measurements done in each of the channels on two reference samples making it possible to deliver a same measurement of one of the investigated properties and having predetermined and separate thicknesses; the parameter can assume two separate values depending on an equivalent thickness in a first material having the investigated property shared by the two reference samples.

BRIEF DESCRIPTION OF THE DRAWINGS

The invention will be better understood and other advantages thereof will appear from the detailed description of one embodiment provided as an example, the description being illustrated by the attached drawings, in which.

For clarity, like elements will bear like references in the various figures.

DETAILED DESCRIPTION OF THE DRAWINGS

Figure 1:
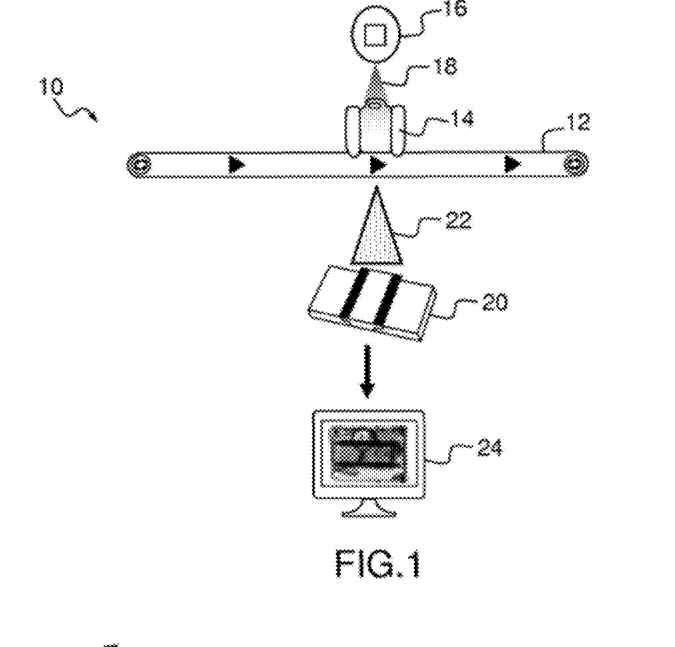
FIG. 1 shows an exemplary system allowing the specific detection of materials in luggage.

FIG. 1 shows an exemplary baggage testing system 10, for example able to be used in an airport. The system 10 is provided to detect materials considered to be dangerous, for example explosive materials. The system 10 comprises a conveyor belt 12 on which luggage 14 to be tested is placed. An x-radiation generator 16 is positioned on one side of an area where the luggage 14 circulates on the conveyor belt 12. The invention can be used for other types of ionizing radiation, for example gamma radiation. The generator 16 emits an incident radiation 18 that passes through the luggage 14. A detector 20 is positioned on another side of the area in order to receive the radiation 18 altered by passing through the luggage 14. The altered radiation, called transmitted radiation, bears reference 22. The detector is connected to a computer 24 configured to analyze information coming from the detector 20 and to display an image representative of the contents of the luggage 14. In this image, the materials contained in the luggage 14 are identified. It is possible to position the components of the system 10 differently in order to prevent the radiation from passing through the conveyor belt 12.

It is understood that the invention can be applied in other fields where one wishes to identify materials, for example the identification of an atomic number, or more generally of physical properties of test samples. It is, for example, possible to use the invention to determine the content of a material contained in another type of material, for example the fat level of a meat.

The properties are found using the analysis of the X radiation or gamma radiation transmitted or reflected. Hereinafter, an analysis model of transmitted radiation is described. It is possible to adapt this model to the analysis of reflected radiation.

More generally, a test sample is subjected to ionizing radiation (x-rays or gamma rays) 16. The computer 24 determines physical properties of materials contained in the test sample based on the attenuation of the ionizing radiation passing through the test sample. The generator 16 is configured to emit radiation in an extended energy range. This type of radiation is called polychromatic. As an example, it is possible to use x-radiation in an energy range from 20 to 200 keV.

The detector 20 is configured to discern the energy of the received photons. In other words, the detector 20 is a spectrometric detector having several channels, each channel making it possible to measure the quantity of radiation received in a given energy band, the different energy bands being able to be separate or superimposed. It is possible to implement a multi-energy scintillation detector. This type of detector has several scintillators that are each sensitive to a given energy band. Associated with each scintillator, the detector comprises a processing channel making it possible to filter and shape the signal coming from each scintillator. The scintillation detector operates in the integration mode and measures a signal depending on the average of the energy deposited by the photons, which makes this measurement sensitive to the hardening effect of the spectrum. The hardening effect varies as a function of the nature and thickness of the materials passed through; it increases the noise and complicates the analysis.

Alternatively, it is possible to implement a spectrometric detector making it possible to detect each individual photon, and to quantify its energy, in order to classify these photons in a histogram to build an energy spectrum. The X photons are detected by a detector that converts the energy deposited by the incident photons into an electrical signal. Such a detector, for example, comprises a crystal configured to convert the energy received from a photon into charge packets, measured by a charge amplifier.

In order to implement the invention, the detector 20 has at least three channels. Tests were successfully done using a spectrometric detector with 64 channels.

From measurements done in each channel, variables are calculated, each formed by a combination of measurements of different channels. These combinations can be of any kind, such as additions or subtractions of measurements done in several channels. Other operators between channels can be used to perform the combinations, for example multiplications or divisions, powers, etc.

Table (1) provides an example of eight variables denoted V1 to V8 obtained using sums denoted S and ratio between sums of measurements done in channels numbered from 1 to 55. For example, the variable V1 is formed by the sum of the measurements done in channels 2 to 7.

TABLE (1)

| Variable Name | Formula to be used |
| --- | --- |
| V1 | S(2, 7) |
| V2 | S(2, 10) |
| V3 | S(2, 15) |
| V4 | S(2, 17) |
| V5 | S(9, 16) |
| V6 | S(20, 26) |
| V7 | S(27, 55) |
| V8 | S(27, 55)/S(2, 17) |

It is possible to normalize the measurements of each of the channels. More specifically, the normalization can be done by dividing the measured value of the flux of photons having passed through the test sample by the measured value of the same flux of photons not having passed through the sample. Alternatively, it is possible to keep the measured values in each of the channels without normalizing them.

To simplify the calculations, it is possible to perform the normalization with the calculation of the variables, for example by using the following equation 1 for a sum S:

$$S(d, f) = -\ln \frac{\sum_{d}^{f} Nc}{\sum_{d}^{f} N0_c}$$ (Equation 1)

d and f represent the no. of the start channel and the no. of the end channel in the sum.

NOc represents the number of photons of the incident radiation received by the detector in the channel c. NOc, or empty measurement, can be measured by the detector in the absence of sample.

Nc, or useful measurement, represents the number of photons of the radiation transmitted after passage through the test sample in the same channel c.

In equation 1, the use of the logarithm is not mandatory. The logarithm makes it possible, however, to approach a linear variation of the variables depending on the thickness of the test sample. Indeed, the transmission attenuation approach is an exponential function of thickness.

In a system as described using FIG. 1, the measurements follow one another in a given acquisition direction by the scrolling of the conveyor belt 12. The detector 20 is a linear detector. It is formed by pixels that are sensitive to the transmitted radiation 22. The pixels of the detector 20, for example, extend perpendicular to the acquisition direction. The invention can be used with other forms of detectors. The linear detectors can extend along an arc of circle or any other type of line, in particular to account for shapes of the test sample or an acquisition direction that can be linear or angular. It is also possible to use a detector whose sensitive pixels extend in two dimensions. For example, the first dimension of the detector extends perpendicular to the scrolling direction of the conveyor belt 12, and the second dimension of the detector extends in the scrolling direction of the conveyor belt 12.

The measurement of the incident flux of photons 18 by the detector 20 or empty measurement can be done using lateral pixels of the detector 20 receiving the flux of photons without passing through the luggage 14. It is also possible to measure the incident flux of photons using the detector 20 before the luggage 14 reaches the area passed through by this flux and/or after the luggage 14 has left this area. The measurement of the incident flux of photons 18 and the measurement of the transmitted flux of photons 22 or useful measurements are done by the same detector 20 under the same environmental conditions. More specifically, during use, the x-radiation generator 16 can evolve in terms of temperature and the photon flux that it produces can vary. Likewise, the detector 20 can also deliver a flux measurement capable of varying in particular with the temperature. Performing the flux measurements 18 and 22 under the same environmental conditions makes it possible to protect against any variation in the calculation of the values. The correction of the useful measurement by using the empty measurement can be done during the normalization, as for example described using equation 1 in which NOc represents the empty measurement and Nc represents the useful measurement.

After calculating any normalized variables, a weighting and bias matrix 30 is applied to the variables, making it possible to determine the values of the investigated physical properties of the test sample.

The weighting and bias matrix 30 has the same number of rows as variables, and the same number of columns as investigated physical properties. The matrix is applied to a vector whose components are the variables. This factor is called: "variable vector." The application of the matrix to the variable vector yields a "result vector," the components of which are values of the investigated physical properties. The values of the physical properties can vary continuously in a value range. The different components of the result vector can be analyzed independently of one another, each component being representative of one of the investigated properties.

Figure 2:
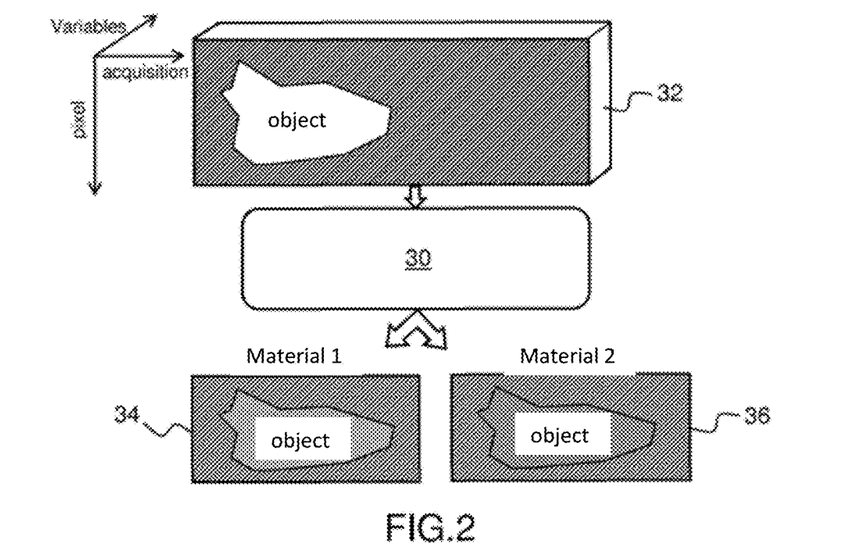
FIG. 2 illustrates a method according to the invention able to be used in the system of FIG. 1.

FIG. 2 illustrates the application of this matrix to a sample scanned by the device 10. A proportion of two mixed materials is investigated in the test sample. It may, for example, involve investigating the fat level contained in a meat. The detector 20 is a linear detector comprising several sensitive pixels. Each pixel makes it possible to measure a spectrum of the x-radiation. More specifically, for each pixel, a photon flux measurement is obtained in each channel. At a given moment, the transmitted radiation 22 passes through a section of the test sample. This sample moves on the conveyor belt 12. The spectrum measurement done by each pixel is repeated in step so as to obtain a series of measurements and the acquisition direction for different sections of the test sample.

After calculating variables, a three-dimensional image 32 of the test sample is obtained. The various pixels of the linear detector form a first dimension. The calculated variables form a second dimension, and the acquisition direction forms the third dimension. With a two-dimensional detector, it is possible to perform instantaneous measurements along the acquisition direction. In the image 32, this direction then corresponds to the line time necessary to read the measurements done by the detector. Using a two-dimensional detector, it is also possible to provide a movement of the test sample, for example on a conveyor belt 12. The measurements done are then made redundant by several pixels extending along the acquisition direction. It is possible to calculate averages on the various redundant measurements in order to reduce the noise on the measurements.

The matrix 30 is applied to this image 32 in order to obtain two two-dimensional images 34 and 36 each corresponding to the value of each of the two investigated characteristics, namely the quantity of material of each of the investigated materials. More generally, the application of the matrix 30 makes it possible to obtain a number of images equivalent to the number of investigated physical properties. For the two images 34 and 36, the different pixels of the linear detector form a first dimension and the acquisition direction forms the second dimension. Each point of the image 34, for example, yields a thickness value of a first material present along a direction of the photon flux. The same is true for the image 36 for a second material.

When a level of one material in another is investigated, for example a fat level, it is possible to calculate, for the corresponding points of each image 34 and 36, a weighted average by coefficient defined empirically, for example from several actual samples whose fat level is determined by another, potentially destructive method, for example the extraction method.

More specifically, in the case of a fat level or a percentage of a first material in a second, it is possible to use the following equation:

$$\text{Fat level} = \frac{Thickness1 \times Parameter1 \times \rho1 + Thickness2 \times Parameter2 \times \rho2}{Thickness1 \times \rho1 + Thickness \times \rho2} \quad \text{(Equation 2)}$$

In equation 2:
Thickness 1 and Thickness 2 represent the equivalent thickness in each of the two materials,
$\rho1$ and $\rho2$ represent the mass density or density of each of the two materials,
Parameter1 and Parameter2 are parameters defined empirically.

In a fat level measurement of a meat, the two materials can be the fat and the lean meat. Alternatively, even for a fat level measurement, it is possible to break down the measurements depending on the thicknesses of predefined materials other than fat and lean meat. Equation 2 makes it possible to calculate the fat level, from determined thicknesses in these two materials.

In order to determine the level of a first material and a second material, it is possible to calibrate the method by using calibration samples formed for example in each of the two pure materials or in different and known proportions to calibrate the method. For example, for a fat level in a meat, it is possible to use two meats having different and known fat contents.

Alternatively, it is possible to use other materials representative of the investigated materials. For example, in order to measure fat levels, it is possible to use polyoxymethylene (POM), the equivalent fat level of which is 49%, and water, the equivalent fat level of which is 2%. The use of these two materials has the advantage of their composition stability, and therefore their equivalent stability relative to the investigated materials.

The invention makes it possible to determine any intermediate fat level value between the actual or equivalent fat levels of the calibration samples. It is also possible to extrapolate values outside the interval defined by the calibration samples. More generally, each component of the result vector can vary continuously in a range.

Additionally, the number of investigated physical properties, that is to say, the number of components of the result vector, can be different from the number of calibration samples. For example, in order to determine a fat level, here forming the only investigated physical property, at least two calibration samples are used.

The thickness of the materials comes into play in the measurements. More specifically, the greater the thickness is, the more the number of transmitted photons decreases. In order to determine a level of one material in another, for a test sample, it is possible to base oneself on calibration samples having the same thickness as the test sample. However, this requires either recalibrating the method with new calibration samples based on the thickness of the test sample, or imposing a precise thickness for the sample to be tested, which is very restrictive.

The invention makes it possible to overcome this constraint by performing a calibration from calibration samples with different thicknesses and different materials, for example polyethylene (PE) and polyvinyl chloride (PVC). The invention is not limited to two different properties. The number of investigated properties is not related to the number of calibration materials. The number of properties that can be discerned depends on the physical limitations of the detector and the type of radiation used.

Figure 3:
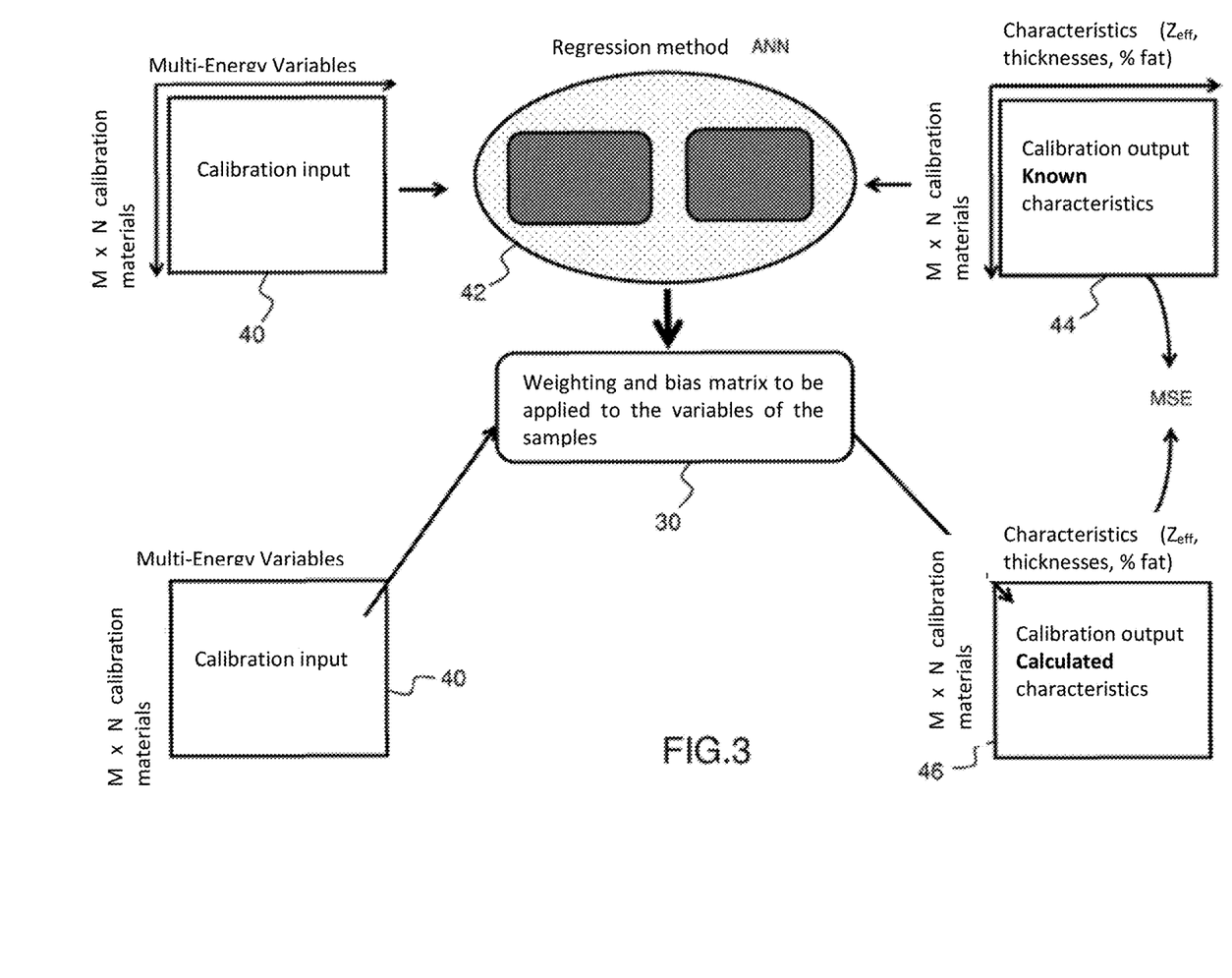
FIG. 3 illustrates a method for calibration of the system of FIG. 1.

FIG. 3 illustrates an exemplary embodiment of such a calibration. For each calibration material and for several thicknesses, measurements are done in all of the channels. For example, for the first calibration material, M samples with different thicknesses are made, and for the second calibration material, N samples with different thicknesses are made. Each of the samples of the first material is stacked with each of the samples of the second material. For each of the stacks, a measurement is done on each of the channels, which yields N×M measurements per channel. Next, for each of the stacks, the variables are calculated. All of the results of these calculations are grouped together in a calibration input matrix 40.

Furthermore, it is possible to define a matrix 44, called calibration output matrix, grouping together the expected values in each of the investigated properties for each of the N×M measurements. In the example described above making it possible to determine the fat content of a meat, two calibration materials are used: polyethylene and polyvinyl chloride. The matrix 44 comprises N×M rows each corresponding to a stack of the two calibration materials and one column defining an equivalent fat level for each stack. More generally, the matrix 44 comprises the same number of columns as the number of investigated properties. The expected values can be theoretical values or values measured by another method.

Using a regression method 42, the values of the variables present in the matrix 40 are linked to the investigated properties of the matrix 44.

The regression method therefore makes it possible to obtain the weighting and bias matrix 30. The regression method that can be used to go from the matrix 40 to the matrix 44 is, for example, a nonlinear artificial neural network method referred to in Anglo-Saxon literature by its initials ANN and described in the document "Fundamentals of Artificial Neural Networks" by Mohamad H. Hassoun, published in 1995 (MIT Press).

After a first determination of the weighting and bias matrix 30, it is advantageous to validate this matrix. The validation can be done by applying it to the variables present in the matrix 40. One thus obtains, for each of the stacks, calculated values of the investigated properties. These calculated values are stored in a matrix 46 having the same size as the matrix 44 of expected values. It is next possible to compare the matrices 44 and 46, for example by defining a mean square error MSE to be minimized and defined as follows in equation 3:

$$MSE = \frac{1}{M \cdot N} \sum_{i=1}^{M \cdot N} (\text{Expected property}_i - \text{Calculated property}_i)^2$$

The weighting and bias matrix 30 is considered to be valid if the mean square error is less than or equal to a given threshold, for example 1% for the fat content. If the value of the mean square error is greater than the given threshold, the combination of measurements of different channels is modified in the calculation of the variables until the value of the desired mean square error is reached. In other words, the best combinations are sought between channels defining the variables making it possible to minimize the mean square error.

Alternatively, it is also possible to define a mean square error to be maximized. The choice between maximizing and minimizing will be made based on the greatest simplicity of the calculations. In the case of a mean square error to be maximized (for example, a MSE maximizing the likelihood between the measurements and the expected values or an inverse factor with respect to equation 3), if the mean square error is greater than or equal to a given threshold, the matrix 30 is then validated. If on the contrary, the value of the mean square error is below the given threshold, the combination of measurements of different channels is modified in the calculation of the variables until the value of the desired mean square error is reached.

The calibration can be done in the factory during the manufacture of the system 10. During use, the system can evolve slightly, and the calibration can be redone periodically. The evolution of the measurements done by the system can come from intense use causing heating of the various components of the system, and in particular of the generator 16. It is possible to avoid completely redoing the calibration as described above while retaining good stability of the measurements over time. To that end, the measurements are corrected using one or several reference samples made from one or several reference materials and scanned with the test sample. The reference material(s) or composition(s) and known thicknesses. The reference material(s) can be identical to the calibration materials, but do not have to be.

In the system shown in FIG. 1, it is possible to place a sample of the reference material next to the test sample, across from lateral pixels of the detector 20 not located on the path of the photons passing through the test sample. This makes it possible to perform the useful measurement simultaneously, that is to say, of the test sample and the reference measurement through the reference sample(s). This configuration also makes it possible to incorporate the sample of the reference material into the device 10. Conversely, this requires a detector 20 whose length is greater than that of the useful area in which the test sample is located. Additionally, the useful measurements and the reference measurements are not done by the same pixels of the detector.

Figure 4:
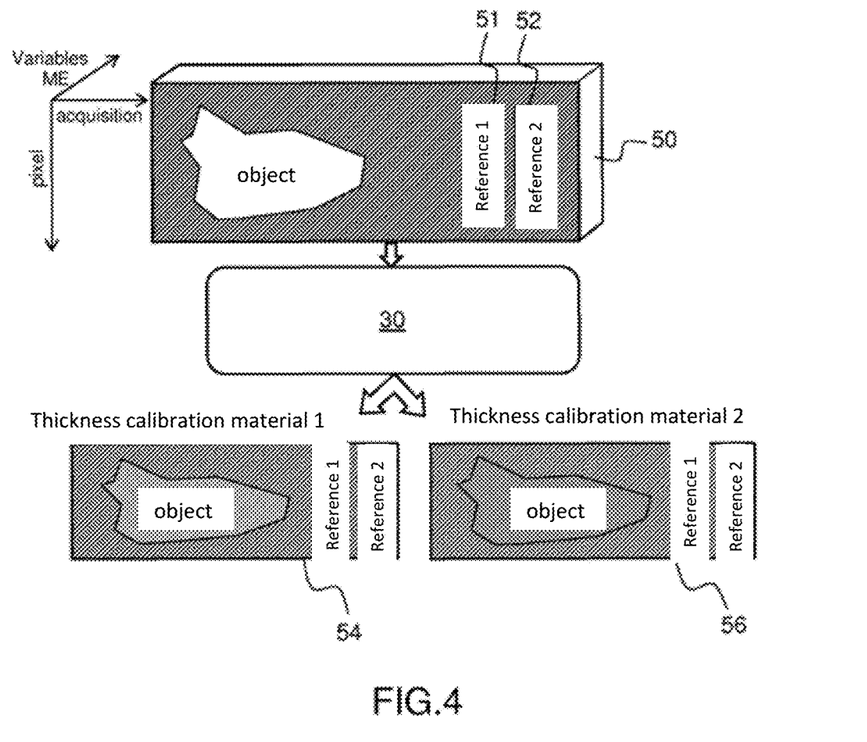
FIG. 4 illustrates the adaptation according to the invention using reference samples scanned with a test sample.

Alternatively, it is possible to position the reference sample(s) upstream or downstream from the test sample in the acquisition direction. This alternative is illustrated in FIG. 4, which shows a three-dimensional image 50 similar to the image 32 in which two reference samples 51 and 52 are shown. These two samples are each made from one of the reference materials used to determine the fat level of a meat, or two meats with known fat levels and in predetermined thicknesses or other equivalent materials, for example water and polyoxymethylene.

It is considered that the measurements on the test sample and the two reference samples are done simultaneously or substantially simultaneously, if the measurements belong to the same image. Alternatively, it is possible to shift the measurements on a test sample and the measurements on the reference samples temporally. The time shift is defined as a function of the observed temporal stability for the system. It is, for example, possible to place a reference sample periodically, after passage of several test samples.

Unlike the complete calibration method, in which for each of the calibration materials, several thicknesses are analyzed, in the correction method, it is possible to implement only one reference material. It is possible to provide only a single reference sample with a single thickness, or alternatively, several reference samples, with different thicknesses and made from the same material. The choice of the number of reference samples is made based on the desired precision in the determination of the investigated properties.

The matrix 30 is applied to the image 50 in order to obtain two two-dimensional images 54 and 56 each corresponding to the output value of one of the two calibration materials. The images 54 and 56 are similar to the images 34 and 36 described above. In the images 54 and 56, the values are found that correspond to the two reference samples 51 and 52. Using these two images 54 and 56, it is possible to adapt the parameters of equation 2.

Figure 5:
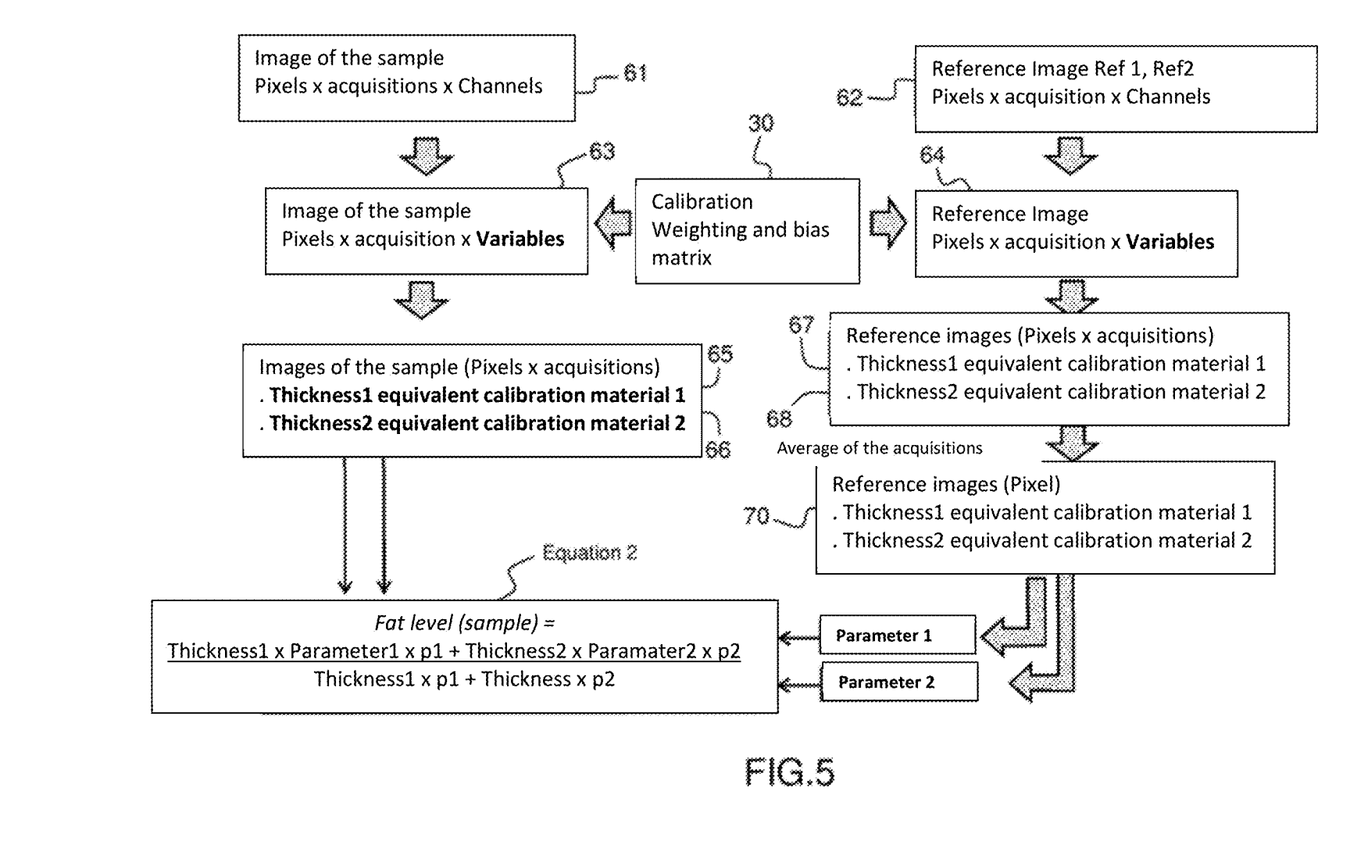
FIGS. 5 and 6 specify two embodiments of the adaptation illustrated in FIG. 4.

FIG. 5 illustrates the adaptation of the parameters done using two reference samples, denoted Ref1 and Ref2, made from two different materials.

A three-dimensional image (Pixels, Channels, Acquisition) is produced for the test sample, image 61, and for the two reference samples, image 62. In practice, the two images can be grouped together into just one. The combinations of channels are next done in order to obtain the variables previously described. One thus obtains a three-dimensional image (Pixels, Variables, Acquisition) for the test sample, image 63, and for the two reference samples, Image 64. In FIG. 4, the image 50 groups together the two images 63 and 64. Using the weighting and bias matrix, two two-dimensional images (Pixel, Acquisition) 65 and 66 are calculated for the test sample, giving the equivalent thickness of the test sample in each of the two calibration materials. The same operation is performed for the two reference materials in order to obtain two two-dimensional images (Pixel, Acquisition) 67 and 68 giving the equivalent thickness of the reference samples Ref1 and Ref2 in each of the two calibration materials.

Next, for the images 67 and 68, an average of the acquisitions is done in order to reduce the noise on the measurements. This average of the acquisitions is given in the box 70. It is possible to keep separate equivalent thickness values for each pixel of the detector 20 and still look for parameters adapted to each of the pixels. Alternatively, to simplify the calculations, it is possible to take an average over all of the pixels and next to look for common parameters for the entire detector 20.

From known properties for each of the reference samples Ref1 and Ref2, it is possible to find the parameters by solving equations 4 and 5 derived from equation 2.

$$Ref1(\%) = \frac{Thickness1(Ref1) \times Parameter1 \times \rho1 + Thickness2(Ref1) \times Parameter2 \times \rho2}{Thickness1(Ref1) \times \rho1 + Thickness2(Ref1) \times \rho2} \quad \text{Equation 4}$$

$$Ref2(\%) = \frac{Thickness1(Ref2) \times Parameter1 \times \rho1 + Thickness2(Ref2) \times Parameter2 \times \rho2}{Thickness1(Ref2) \times \rho1 + Thickness2(Ref2) \times \rho2} \quad \text{Equation 5}$$

In equations 4 and 5:
- Thickness1 (Ref1) and Thickness 1(Ref2) are measurements of the equivalent thicknesses of the reference materials in the first calibration material,
- Thickness 2(Ref1), Thickness 2(Ref2) are measurements of the equivalent thicknesses of the reference materials in the second calibration material,
- $\rho1$ and $\rho2$ are the densities of calibration materials 1 and 2,
- Ref1(%) and Ref2(%) are, for example, fat level estimates of the reference materials.

Solving equations 4 and 5, the unknowns of which are Parameter1 and Parameter2, makes it possible to reintroduce these parameters into equation 2 in order to determine the fat level, and more generally the proportions of one material in another, of the test sample.

In the adaptation of the parameters illustrated using FIG. 5, it is considered that the two parameters do not vary as a function of the equivalent thickness in each of the calibration materials. In practice, however, it has been observed that in order to determine the proportion of one material in the other more finely, it is useful to cause the value of the parameters to evolve as a function of the equivalent thickness determined using the images 34 and 36.

Figure 6:
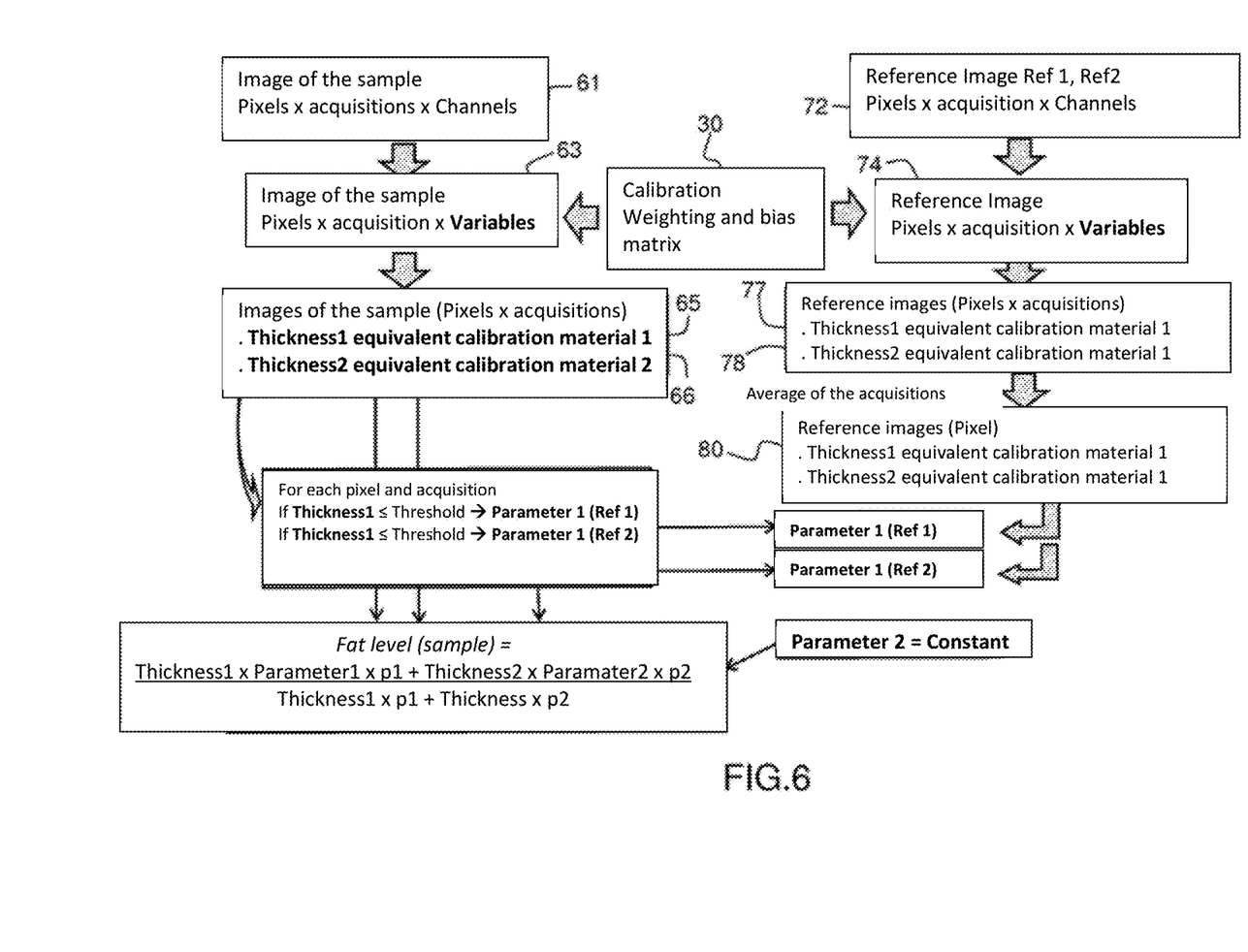

FIG. 6 illustrates a method that can be implemented for this value adaptation of a parameter. To make it easier to understand, it is considered that one of the parameters is frozen, parameter2 in the illustrated example. It is of course possible to adapt the method of FIG. 6 for all of the parameters.

FIG. 6 shows the images 61, 63, 65 and 66 for the test sample. It will in particular be recalled that the image 65 gives the equivalent thickness of the test sample in the first calibration material. Unlike the method illustrated using FIG. 5, in the method illustrated using FIG. 6, the two reference samples are made from a same material that can be one of the calibration materials, but does not necessarily have to be. More generally, the two reference samples give the same measurement of a common investigated property.

Unlike FIG. 5, in FIG. 6, the two reference samples have distinct predetermined thicknesses. FIG. 6 shows: an image 72 with three dimensions (Pixels, Channels, Acquisition) for the two reference samples as well as two images with two dimensions (Pixel, Acquisition) 77 and 78 giving the equivalent thickness of each of the reference samples in the first calibration material.

Next, for the images 77 and 88, an average over the acquisitions is done in order to reduce the noise on the measurements. This average on the acquisitions is given in the box 80. Like before, it is possible to keep distinct equivalent thickness values for each pixel of the detector 20 or to obtain an average over all of the pixels and next to look for parameters shared by the entire detector 20.

From the property shared by the two reference samples, denoted Ref (%), it is possible to find two values of the parameter that are adapted to each of the two thicknesses of each of the two reference samples. For the first reference sample, denoted Ref1 and thicknesses: Thickness1(Ref1), Thickness2(Ref1), the parameter denoted: Parameter1 (Ref1) is calculated with equation 6:

$$Ref(\%) = \frac{Thickness1(Ref1) \times Parameter1(Ref1) \times \rho1 + Thickness2(Ref1) \times Parameter2 \times \rho2}{Thickness1(Ref1) \times \rho1 + Thickness2(Ref1) \times \rho2}$$

For the second reference sample denoted Ref2 and thicknesses: Thickness1 (Ref2) and Thickness2(Ref2), the parameter denoted: Parameter1(Ref2) is calculated with equation 7:

$$Ref(\%) = \frac{Thickness1(Ref2) \times Parameter1(Ref2) \times \rho1 + Thickness2(Ref2) \times Parameter2 \times \rho2}{Thickness1(Ref2) \times \rho1 + Thickness2(Ref2) \times \rho2}$$

The two parameters Parameter1(Ref1) and Parameter1 (Ref2) are next used in equation 2 in order to determine, for the sample to be tested, its fat level and more generally the proportions of one material in another.

From the image 65 giving the equivalent thickness of the test sample in the first investigated material, it is possible to define a thickness threshold below which one of the values of the parameter is used, for example Parameter1(Ref1), and above which the other value of the parameter is used, Parameter1(Ref2). The thickness threshold is, for example, equal to the average of the thicknesses of the two reference samples Ref1 and Ref2.

This use of two distinct values of the parameter is appropriate if the two values are adjacent. Alternatively, it is possible to vary the value of the parameter linearly as a function of the thickness defined in the image 65. The variation of the parameter is then defined using two values of the parameter. It is possible to use more than two reference samples of same materials and different thicknesses and to use a regression, for example polynomial, in order to define a variation law of the value of the parameter.

The invention claimed is:

1. A method for determining physical properties of a test sample using a spectrometric detector with at least three channels, the method comprising:
   performing measurements in each channel of a plurality of channels on a plurality of calibration samples with different thicknesses and different materials;

calculating variables on each of the calibration samples, each variable being formed from an associated combination of the measurements in the plurality of channels;

during a first calibration step, using a regression method, linking the variables relative to the calibration samples to expected values of the physical properties of the calibration samples, by defining a weighting and bias matrix;

during a second calibration step,
  applying the weighting and bias matrix to the variables relative to the calibration samples to obtain calculated values of the physical properties of the calibration samples;
  calculating a value of the mean square error (MSE) relative to a deviation between the calculated values of the physical properties of the calibration samples and the expected values of the physical properties of the calibration samples; and
  if the value of the mean square error (MSE) verifies a predetermined condition relative to a predetermined threshold, validating the weighting and bias matrix; or
  if the value of the mean square error (MSE) does not verify the predetermined condition relative to the predetermined threshold, modifying the combination of the measurements forming at least one of the variables, then repeating the first and second calibration steps until the value of the mean square error (MSE) verifies the predetermined condition relative to the predetermined threshold;

performing measurements in each of the channels on the test sample;

calculating the variables for the test sample, each variable being formed from the associated combination of the measurements of the different channels; and applying the weighting and bias matrix to the variables to determine values of the physical properties of the test sample, the values of the physical properties being able to vary continuously within a value range.

2. The method according to claim 1, wherein the variables form a variable vector and wherein the application of the weighting and bias matrix to the variable vector yields a result vector, wherein components of the result vector are the values of the physical properties.

3. The method according to claim 1, wherein the variables are normalized using a ratio between useful measurements of a radiation attenuated by the sample and empty measurements of the radiation not attenuated by the sample.

4. The method according to claim 3, wherein the variables are normalized using a logarithm of the ratio.

5. The method according to claim 1,
wherein the mean square error (MSE) is a mean square error (MSE) to be minimized,
wherein the weighting and bias matrix is validated if the value of the mean square error (MSE) is less than or equal to a predetermined threshold,
wherein the measurement combination of the different variables is modified if the value of the mean square error (MSE) is above the threshold, and
wherein the first and second calibration steps are repeated until the value of the mean square error (MSE) is less than or equal to the threshold.

6. The method according to claim 1,
wherein the mean square error (MSE) is a mean square error (MSE) to be maximized,
wherein the weighting and bias matrix is validated when the value of the mean square error (MSE) is greater than or equal to a predetermined threshold,
wherein the measurement combination of at least one of the variables is modified when the value of the mean square error (MSE) is below the threshold, and
wherein the first and second calibration steps are repeated until the value of the mean square error (MSE) is less than or equal to the threshold.

7. The method according to claim 1,
wherein a determination of the physical properties calls on at least one parameter;
wherein the at least one parameter is suitable for assisting with measurements done in each of the channels on a reference sample of a predetermined thickness; and
wherein at least one of the physical properties of the reference sample is known.

8. The method according to claim 7,
wherein the measurements of the reference sample are done simultaneously with the measurements on a test sample, and
wherein the at least one parameter is suitable for determining the physical properties of the sample to be tested.

9. The method according to claim 7,
wherein the at least one parameter is suitable for assisting with measurements done in each of the channels on two reference samples, making it possible to deliver a same measurement of one of the physical properties and having predetermined and separate thicknesses, and
wherein the at least one parameter can assume two separate values depending on an equivalent thickness in a first material having the physical property shared by the two reference samples.

10. The method according to claim 8,
wherein the at least one parameter is suitable for assisting with measurements done in each of the channels on two reference samples, making it possible to deliver a same measurement of one of the physical properties and having predetermined and separate thicknesses, and
wherein the at least one parameter can assume two separate values depending on an equivalent thickness in a first material having the physical property shared by the two reference samples.

\* \* \* \* \*